Patented Oct. 7, 1930

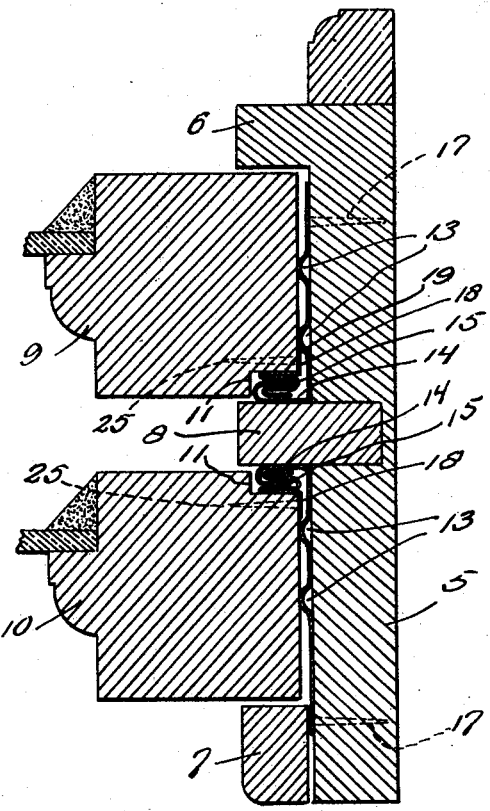
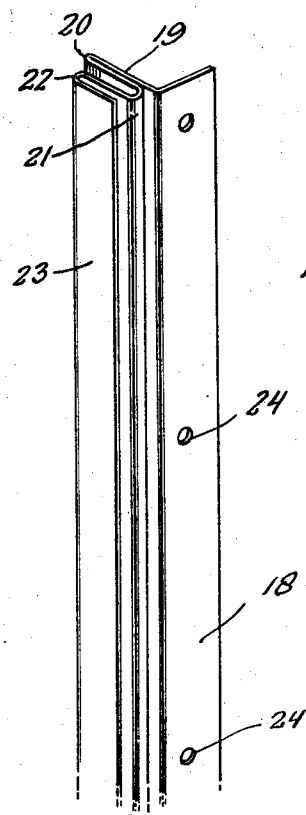
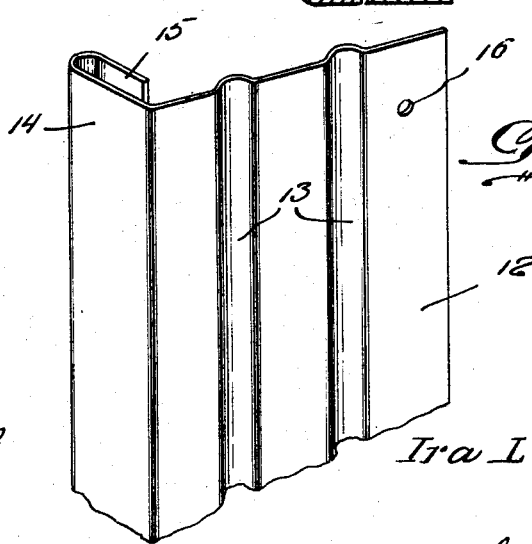

1,777,627

UNITED STATES PATENT OFFICE

IRA L. REED, OF CHICAGO, ILLINOIS, ASSIGNOR TO PYRAMID METALS COMPANY, OF CHICAGO, ILLINOIS

WEATHER STRIP

Application filed July 2, 1929. Serial No. 375,390.

This invention relates to metal weather strips for windows and especially to strips of this kind for use on windows in which the sashes slide within the window frame.

One of the features of the construction embodying my invention is the provision of coacting metal weather strip members adapted to be secured to the frame and sliding sashes of a window and so formed that an air tight seal is had between the strip members, while friction between the strip members as one slides upon the other will be small.

Another feature of the present invention is that the seal effected by the weather strip members is located next to the parting strip of the window frame, whereby the entrance of air is effectively prevented and liability of the side members of the sashes warping and binding is reduced to a minimum.

Still another feature is the provision of a simple, durable and efficient weather strip construction embodying means to properly guide the sashes to further guard against binding thereof, and means to permit limited yielding of the sashes in directions parallel and transverse to the plane of the same, so that smooth, easy movement of the sashes in the frame is insured under various conditions of use.

The invention consists in the novel form, combination and arrangement of parts hereinafter more fully described, shown in the accompanying drawing, and claimed.

In the drawing:—

Figure 1 is a cross-section of one side of a window frame and the two sliding sashes therein, provided with weather strips embodying the present invention; and Figures 2 and 3 are fragmentary perspective views, showing the sash and frame weather strip members, respectively, of the weather strips shown in Figure 1.

Referring in detail to the drawing, 5 indicates a window frame for sliding sashes, and 6 and 7 are stops for the sashes carried by the frame 5. A parting strip 8 is secured to the frame, as shown. The two sashes 9 and 10 are adapted to slide in the frame, each having its side members received and guided in the channel formed between the parting strip 8 and one of the stops at the sides of the frame.

Each of the sashes has a lengthwise groove or rabbet 11 cut in each side member thereof adjacent the parting strip 8 to receive the coacting portions of the weather strip members, so that those portions of the members will lie close to the parting strip as shown in Figure 1.

Each weather strip construction consists of a member for attachment to the window frame and a member for attachment to the adjacent side member of the adjacent sash, said strip members having coacting portions received in the rabbet of said side sash member between the latter and the adjacent side of the parting strip. The strip member for attachment to the window frame comprises a strip of resilient metal formed to provide a relatively wide body portion 12 having a plurality of spaced longitudinal corrugations 13 intermediate the side portions thereof, and an extension 14 on one of said side portions bent at right angles thereto and inwardly return bent as at 15 to form a hook-shaped portion, as shown in Figures 1 and 3. This strip member is perforated along its other side portion as at 16 for attachment to the window frame as at 17. The corrugations 13 are adapted to engage the other edge of the side sash member to assist in guiding the sash, but as these corrugations are slightly yieldable, the sash may have limited play in a direction parallel with the plane thereof to insure easy movement of the same under various conditions of use. Further, the extension 14 is adapted to contact the adjacent side face of the parting strip, and the return-bent part 15 lies within the rabbet 11 of the adjacent side sash member to engage the coacting portion of the weather strip member attached to said sash member, as will presently be described.

Each strip member secured to the side sash member comprises a strip of resilient metal formed to provide a narrow body portion 18 having a right angle extension 19 at one side return-bent or folded three times as at 20, 21 and 22 to form a resilient double-walled groove member adapted to slidably receive the hook member or part 15 of the adjacent frame strip member. The extension 19 is folded so as to leave spaces between the walls of the groove member to receive the member 15, and to provide a yieldable free outer wall 23 for the groove member adapted to contact the inner face of the extension 14 coacting therewith. This insures an efficient seal against the entrance of air and at the same time the wall 23 may give or yield to avoid binding and minimize friction. Holes 24 may be provided in the body 18 to facilitate attachment of this strip member to the sash, the body 18 being secured as at 25 flatly against the outer edge of the side sash member adjacent its rabbet 11 so that the extension 19 is positioned in the latter. The double-walled groove member or portion of the strip member attached to the sash, when engaged by the coacting hook portion of the strip member attached to the frame, will serve to minimize warping and binding of the sash, and the yieldable wall 23 allows limited lateral yielding of the sash in conjunction with the flexible hook member 14, 15 and the corrugations 13, so that binding of the sash is further rendered unlikely.

From the above description, it will be apparent that the weather strip will be very durable, will effectively operate to the end desired in the use thereof, and may be readily applied.

What I claim is:

1. The combination of a window frame, a sash slidably mounted therein, and coacting weather strip members on the frame and sash bent along lines extending lengthwise thereof, the strip member on said frame being formed with a relatively wide base portion attached at one side to said frame and provided at the other side with a right angle extension folded inwardly to form a hook portion, the strip member on the sash being formed with a narrow base portion attached to said sash and provided at one side with a right angle extension formed with three folds to provide a double-walled groove member having a space between the second and third walls thereof to receive said hook portion of said frame strip member, the outer wall of said groove member being free and spaced from the third wall of said groove member to provide a yieldable wall cooperating with the members of said hook portion to provide an air-tight seal between the strip members and to allow limited play of the sash transversely of the plane of the latter.

2. A metal weather strip for sliding sashes comprising a strip member having a longitudinally corrugated relatively wide base portion adapted to be attached at one side to a window frame and provided at the other side with a right angle extension folded inwardly to form a hook portion, and a second strip member having a narrow base, adapted to be attached to the outer edge of the side sash member and provided at one side with a right angle extension formed with three folds to provide a double-wall groove member adapted to receive said hook portion, the outer two walls of said groove member being spaced to provide a free yieldable outermost wall adapted to contact the inner face of the right angle extension of the first strip member.

In testimony whereof I affix my signature.

IRA L. REED.